United States Patent [19]

Schorr

[11] Patent Number: 5,005,329
[45] Date of Patent: Apr. 9, 1991

[54] WINDOW SEAL FOR OPTICAL SCANNER

[75] Inventor: Theodore H. Schorr, Eugene, Oreg.

[73] Assignee: Spectra-Physics, Inc., San Jose, Calif.

[21] Appl. No.: 312,696

[22] Filed: Feb. 17, 1989

[51] Int. Cl.⁵ .............................................. G06K 7/10
[52] U.S. Cl. ....................................... 52/204; 52/398; 52/790; 235/462; 350/589
[58] Field of Search .................. 52/171, 396, 397, 790, 52/208, 204, 398; 277/183; 186/61, 60, 59; 235/462, 467; 350/589

[56] References Cited

U.S. PATENT DOCUMENTS

| | | | |
|---|---|---|---|
| 2,285,003 | 6/1942 | Axe | 52/399 |
| 2,303,149 | 11/1942 | Verhagen | 52/399 |
| 2,585,322 | 2/1952 | Bradfield | 52/399 |
| 3,217,454 | 11/1965 | Leisibach | 52/398 |
| 4,691,489 | 9/1987 | Shea | 52/398 |

Primary Examiner—John E. Murtagh
Attorney, Agent, or Firm—Lyon & Lyon

[57] ABSTRACT

A soft compliant seal is attached to either an anchored or a loose reinforcement ring to provide a non-hermetic seal against liquids or particulates in order to maintain a space between two windows substantially free of all foreign matter.

12 Claims, 3 Drawing Sheets

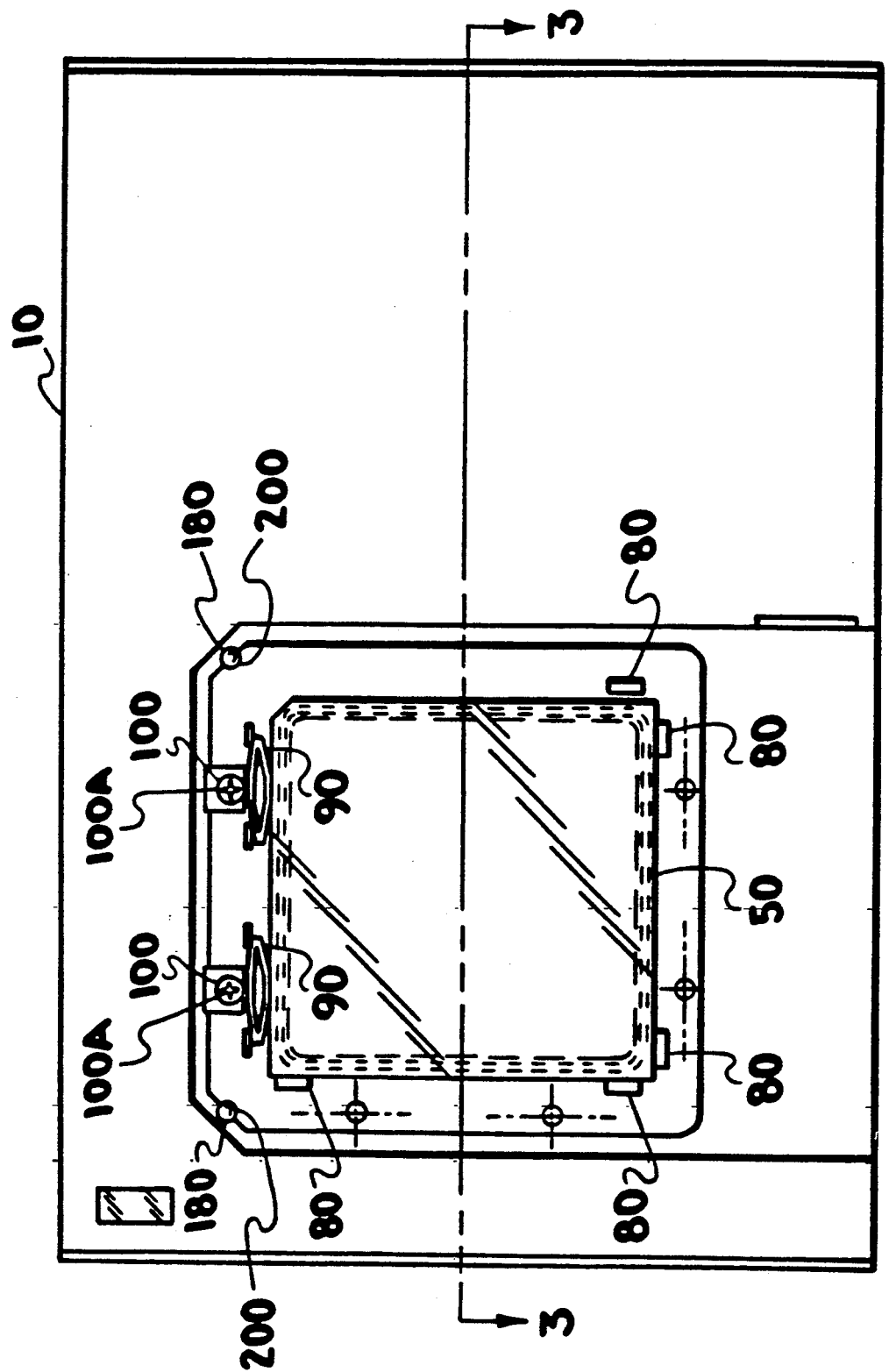

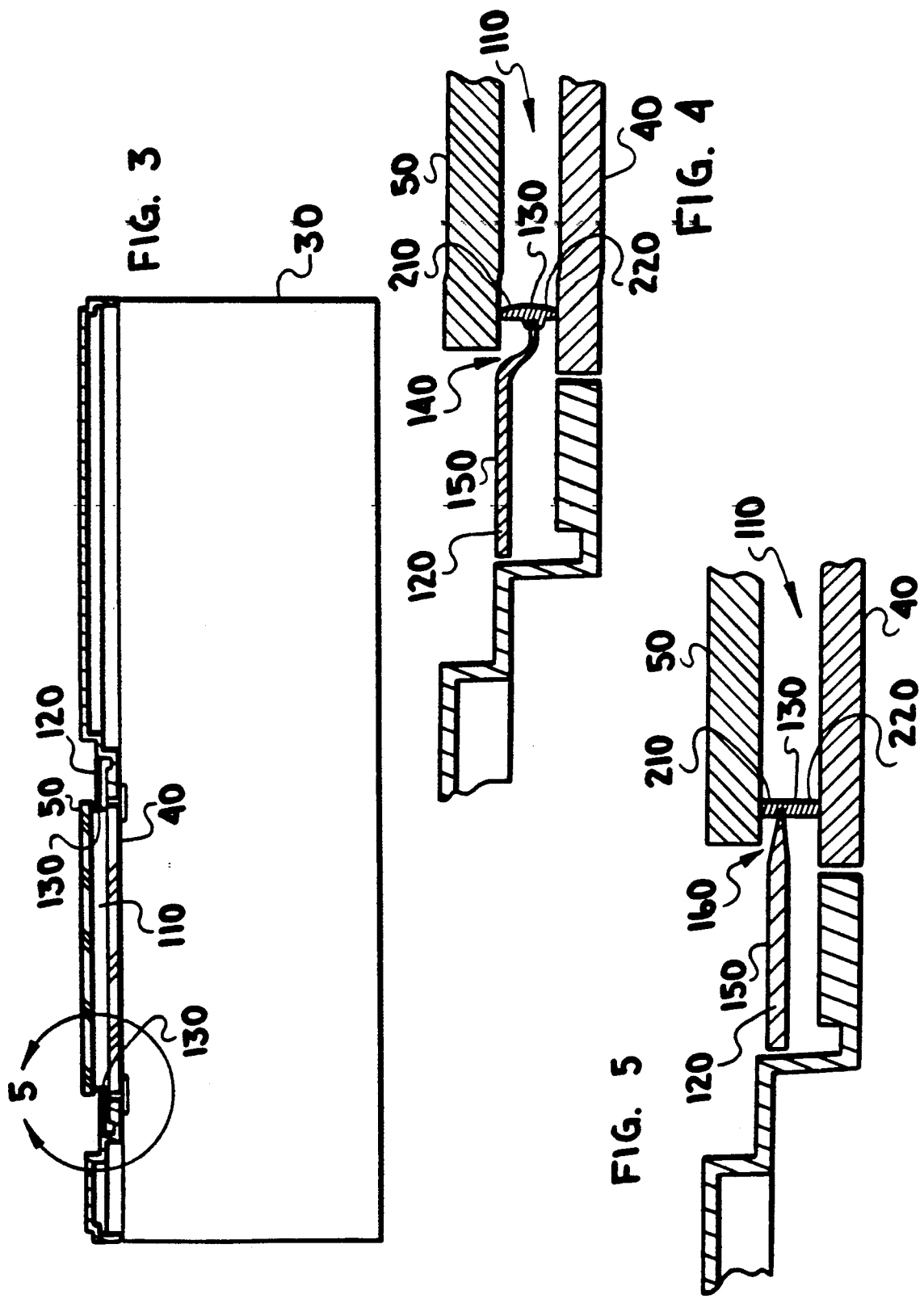

WINDOW SEAL FOR OPTICAL SCANNER

BACKGROUND OF THE INVENTION

1. Field of the Invention

This invention relates to the field of optical scanning and particularly to bar code laser scanners. More particularly it relates to an apparatus and method for sealing the optical surfaces of bar code laser scanners from spilled liquids and other contaminants to which such scanners may be exposed in normal use in a point of sale environment such as a supermarket.

2. Description of Related Art

Supermarket scanners, referred to herein as bar code laser scanners, typically consist of a lower chassis which houses the optical scan line generating elements, a lower sealed window through which the scan lines may pass which is sealed to the chassis, and an upper window which is removable and field replaceable, for example, upon being scratched or broken. In order for the scanner to operate in an optimal fashion, both windows must be optically transparent and free of scratches, smears, discolorations and other contaminants which would prevent the scanner light beam from passing as relatively unimpeded through the windows as possible. This invention relates to a method and apparatus for sealing the space or gap between the lower window and the upper window from contaminants. This space, or gap, as referred to herein, also includes the lower surface of the upper window and the upper surface of the lower window. The distance between the glass windows has high variability and commercial glass varies in thickness and flatness. This presents a requirement for a device capable of sealing the variable distance between the windows and capable of excluding liquids and dust from the gap. Prior art windows not employing a seal have not been able to adequately keep contaminants away from the gap. If contaminants reach the lower window, the lower window must then be cleaned which is frequently difficult, time consuming, and reduces machine availability.

SUMMARY OF THE INVENTION

The present invention comprises a soft compliant seal attached to either an anchored or loose reinforcement ring to provide a seal for the exclusion of liquids and particulates from a gap between a lower window and an upper window.

Accordingly, it is an object of this invention to provide a seal for sealing from contamination the gap existing between two substantially parallel and spaced apart relatively flat surfaces.

It is a further object of this invention to provide an improved method for sealing from contamination the gap existing between two substantially parallel and spaced apart relatively flat surfaces.

It is a further object of this invention to provide an improved seal for an optical scanner window.

It is a further object of this invention to provide an improved method for sealing an optical scanner window.

It is a further object of this invention to provide an improved compliant seal for sealing a gap between a lower window and an upper window which is capable of restricting particulates and liquids from entering the gap.

Other and further objects and advantages of the present invention will appear hereinafter.

BRIEF DESCRIPTION OF THE DRAWINGS

FIG. 3 is a cross-sectional view taken along lines 3—3 of FIG. 2.

FIG. 4 is an enlarged cross-sectional view of area 5 of FIG. 3 showing a first preferred embodiment of the present invention.

FIG. 5 is an enlarged cross-sectional view of area 5 of FIG. 3 showing a second preferred embodiment of the present invention.

DESCRIPTION OF THE PREFERRED EMBODIMENT

The present invention relates generally to a window seal for use in an optical scanner. Optical scanners are used, for example, in supermarkets to read Universal Product Code information from product tags. It is desirable to seal the space or "gap" between the lower window of an optical scanner and the upper window so that contaminants are inhibited from entering that space and blocking or impeding the transmission of light rays from within the scanner to without. As used herein the term "gap" includes the surfaces which define the gap. In a preferred embodiment of the present invention the window seal may be employed in a Spectra-Physics, Inc. Model 750-SL bar code laser scanner available from the Spectra-Physics, Inc. Retail Systems Division, 959 Terry Street, Eugene, Ore. 97402-9120. It is to be understood, however, that the window seal of the present invention can be used in many situations where it is desirable to create a non-hermetic seal resistive to the passing of contaminants between two relatively flat, spaced apart and substantially parallel surfaces.

Figure 1:
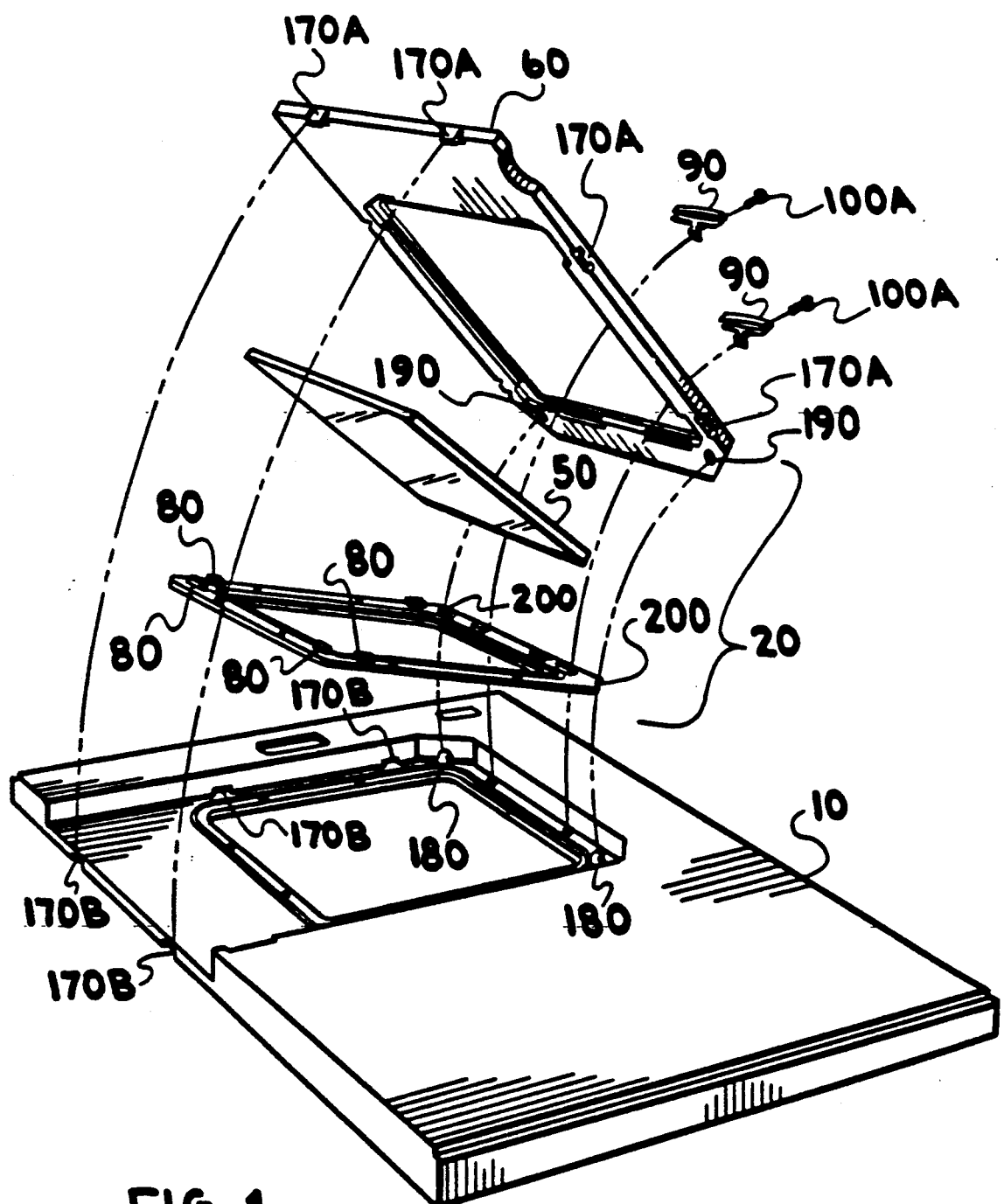
FIG. 1 is an exploded top perspective view of a scanner top plate with a removable top window assembly according to the present invention.
Figure 1:
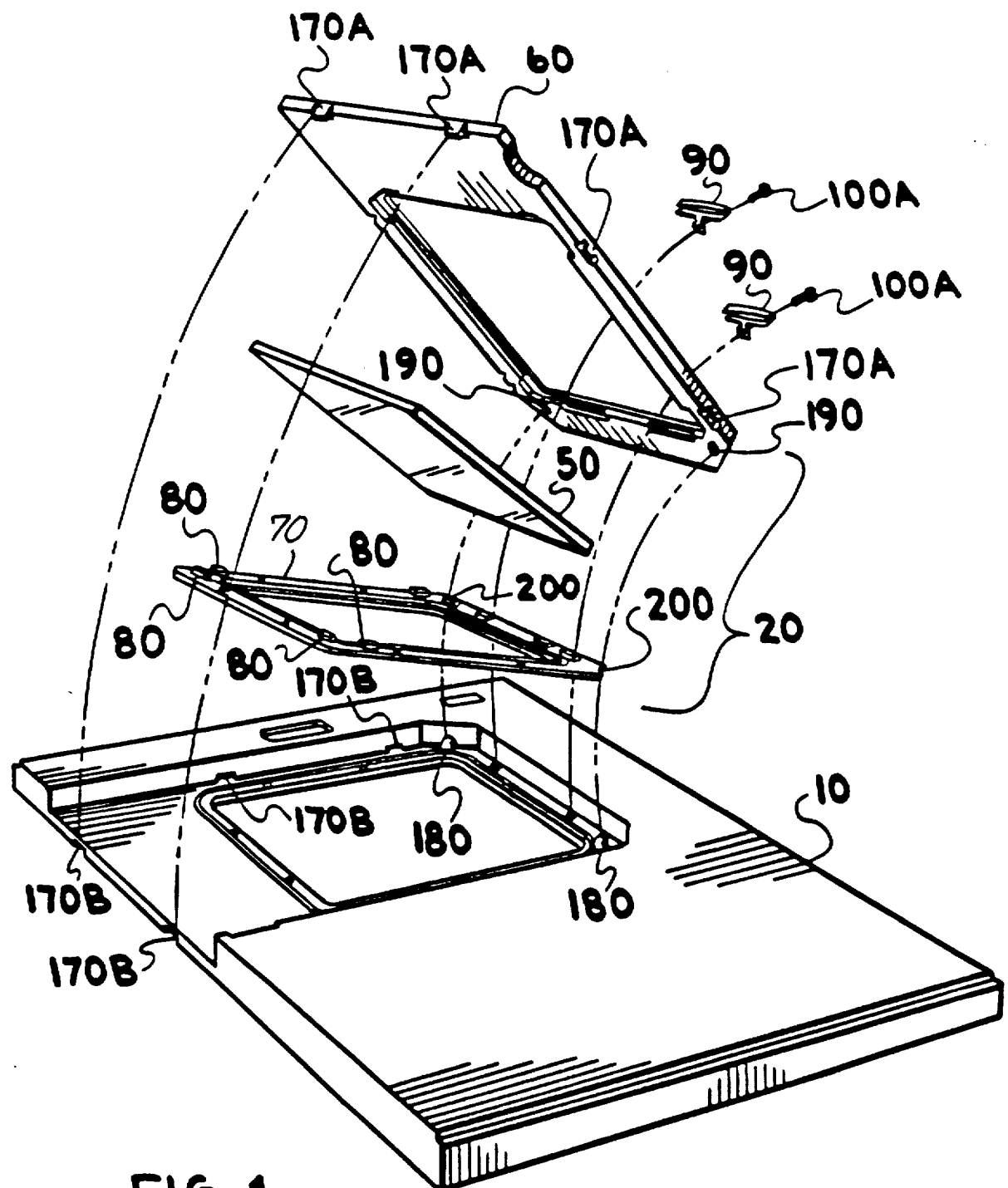

Turning to FIG. 1 of the drawings, an exploded top perspective view of a scanner top plate 10 and window cartridge assembly 20 is shown. In a preferred embodiment, scanner top plate 10 is fastened to the top of an optical scanner unit (shown as 30 in FIG. 3). Scan lines generated by optical scanner 30 are projected through a first window 40 ("lower window") in the optical scanner and then through a second window 50 ("upper window") in the window cartridge assembly. Items bearing information to be scanned, such as, for example, Universal Product Code Information, may be passed over second window 50. The scan lines will reflect off of the information to be scanned and back through windows 50 and 40 where detectors will decode the information for further processing. Scanners of this type are well known in the art and are described in more detail in, for example, U.S. Pat. No(s). 4,713,532 and 4,093,865 which are incorporated herein by reference.

Figure 2:
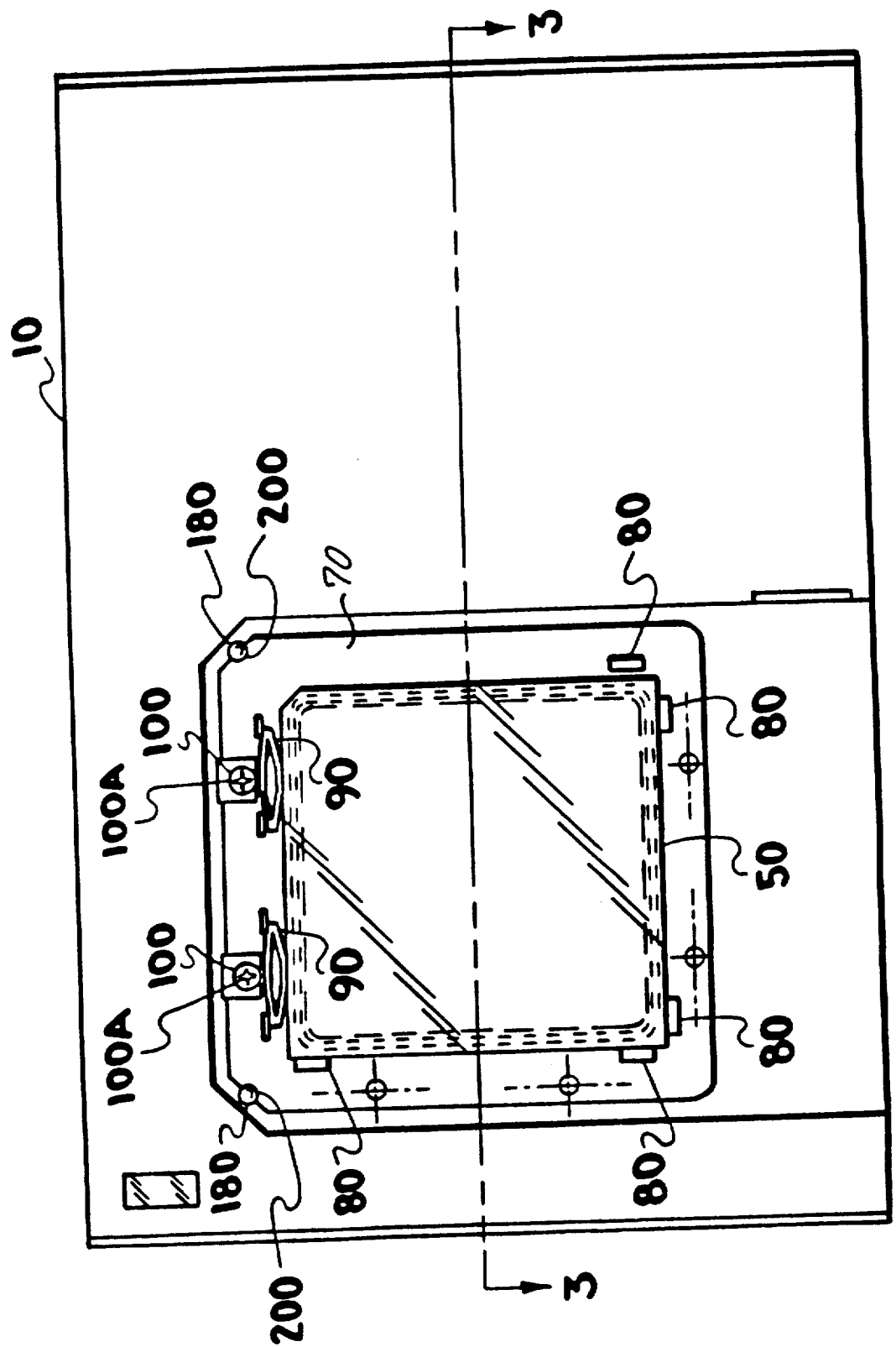
FIG. 2 is a top view of a removable top window assembly with window frame according to the present invention.

In a preferred embodiment of the present invention window cartridge assembly 20 comprises window frame 60, second window 50 and seal rim 70. Turning to FIG. 2, second window 50 is removably seated upon seal rim 70 and positioned by raised portions 80 of seal rim 70. Spring clips 90 bias second window 50 into correct registration with raised portions 80. Spring clips 90 are held in place by nuts and bolts 100A through holes 100. Second window 50 may be manufactured of tempered glass, regular glass, sapphire, a coated glass, or other optically transmissive material that would be suitable (i.e., hard, resistive to scratches, resistive to breaking). Window frame 60 is, in a preferred embodiment, manufactured of injection molded plastic as well known in the art. As used in a preferred embodiment, second window 50 lies above and substantially parallel to first window 40 which is typically permanently bonded to optical scanner 30 with a silicone based adhesive. A gap or space 110 remains between first window 40 and second window 50 as can be seen in FIGS. 3, 4 and 5. In order to form a seal to exclude contaminants from gap 110 seal rim 70 is provided. Turning now to FIGS. 3, 4 and 5, seal rim 70 comprises a tough plastic outer rim 120 and a soft compliant seal member 130. In a preferred embodiment of the present invention, outer rim 120 is fabricated of injection molded polycarbonate plastic such as, for example, General Electric type GE Lexan 920 available from the General Electric Corporation. In a preferred embodiment, seal member 130 is fabricated of a soft durable silicone rubber having approximately a durometer reading of 15 on the Shore-A scale. An example of an acceptable material is Type GI-570 Silicone Rubber available from Silicones, Inc. of 1020 Surrette Drive, P.O. Box 363, Hypoint, N.C. 27261. Other types are also acceptable as known to those of skill in the art.

In a preferred embodiment of the present invention, the seal member 130 is attached to the outer rim 120 in the following manner, although other methods could be used as well known to those of skill in the art:

First, outer rim 120 is injection molded and includes at its inner periphery a plurality of slots or holes (not shown) therethrough. Second, outer rim 120 is placed in a jig and a two-step injection molding process is carried out whereby seal member 130 is injection molded to the inner periphery of outer rim 120, the material of seal member 130 flowing through the slots and aiding in the attachment of seal member 130 to outer rim 120. This process is well known in the art and therefore will not be described further herein.

In a first preferred embodiment of the present invention as depicted in FIG. 4, seal rim 70 has a tapered region 140 where the rim material tapers from a first thickness to a second lesser thickness at the inner periphery of outer rim 120. It is at the narrow portion of outer rim 120 that seal member 130 is attached. In the tapered region 140 the outer rim material slopes downwardly and away from upper window 50 and toward lower window 40 as shown to allow seal member 130 to be relatively recessed with respect to top surface 150 of outer rim 120.

In a second preferred embodiment of the present invention as depicted in FIG. 5, the downward slope to tapered region 160 is omitted.

The purpose for having tapered region 140 of the first preferred embodiment and tapered region 160 of the second preferred embodiment is to increase the flexibility and compliance of the seal in order to more easily accommodate variations in the thickness and flatness of the glass of first window 40 and second window 50. Accordingly, the seal member 130 can more easily adjust to the variations in distance between the two windows. By narrowing the thickness of the flange material in the above-described manner seal member 130 is more able to conform to irregularities in the shape of windows 40, 50.

Seal member 130, in a one preferred embodiment, comprises a single upwardly depending flange 210 for contacting the upper window and a single downwardly depending flange 220 for contacting the lower window. In another preferred embodiment, more than one upwardly depending flange may be used and in another preferred embodiment, more than one downwardly depending flange may be used. In this manner, additional sealing capabilities may be obtained.

In use, the seal of the present invention conforms well to both the lower window 40 and the upper window 50 providing an improved seal to exclude contaminants such as liquids and dust from entering gap 110 or contacting the upper surface of lower window 40 as the lower surface of upper window 50.

It is to be understood that window frame 60 is insertable into scanner top plate 10 in a preferred embodiment whereby window frame 60 is restrained by snap fasteners 170A, 170B as is well known in the art. Pins 180 position holes 190 in window frame 60 and cutouts 200 in seal rim 70 as well known in the art.

While embodiments and applications of this invention have been shown and described, it would be apparent to those of skill in the art that many more modifications are possible without departing from the inventive concepts herein. The invention, therefore, is not to be restricted except in the spirit of the appended claims.

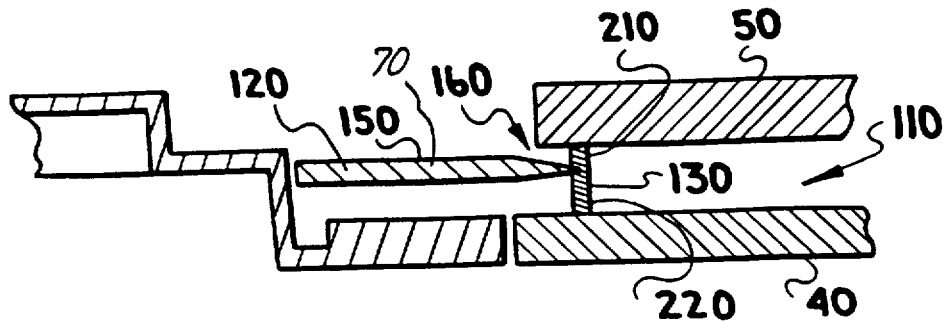

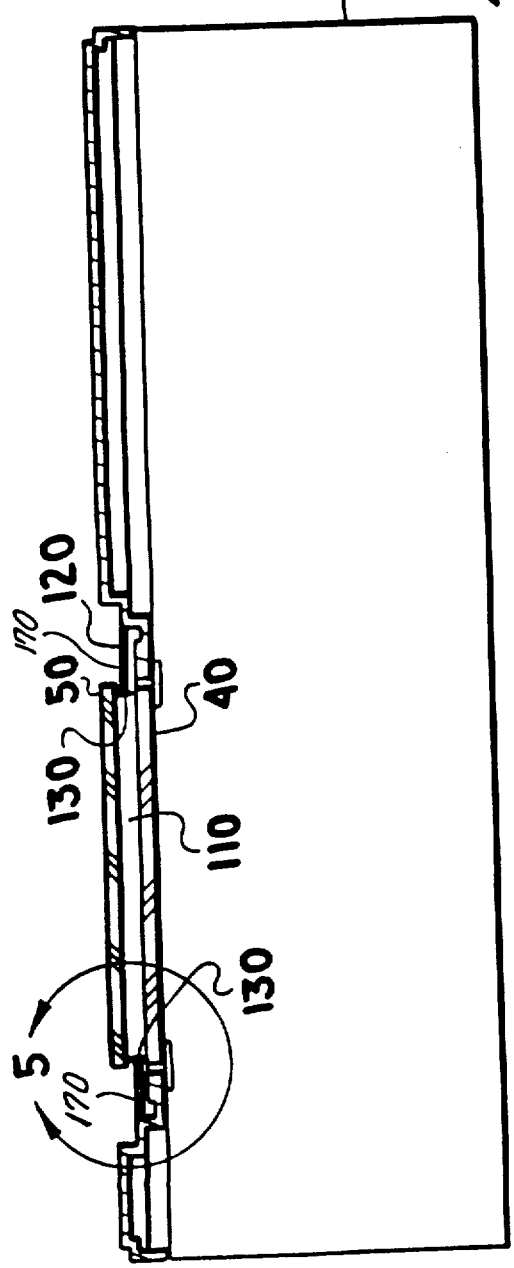
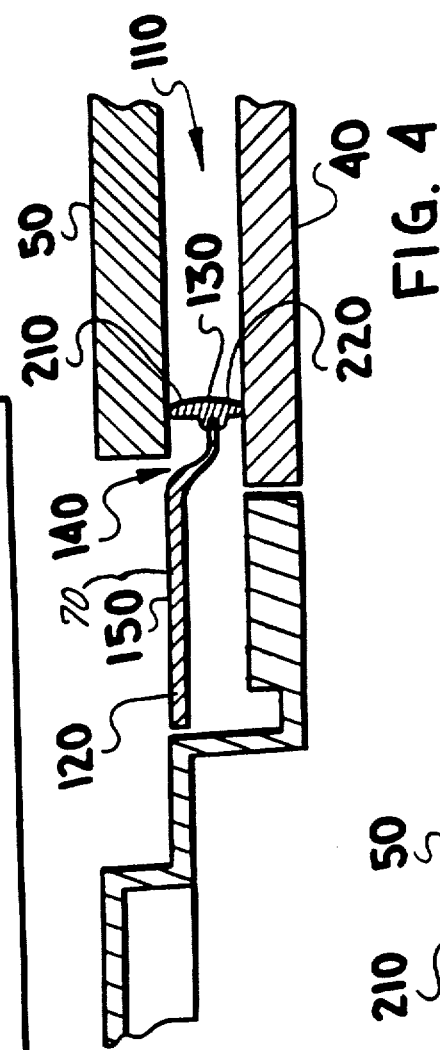
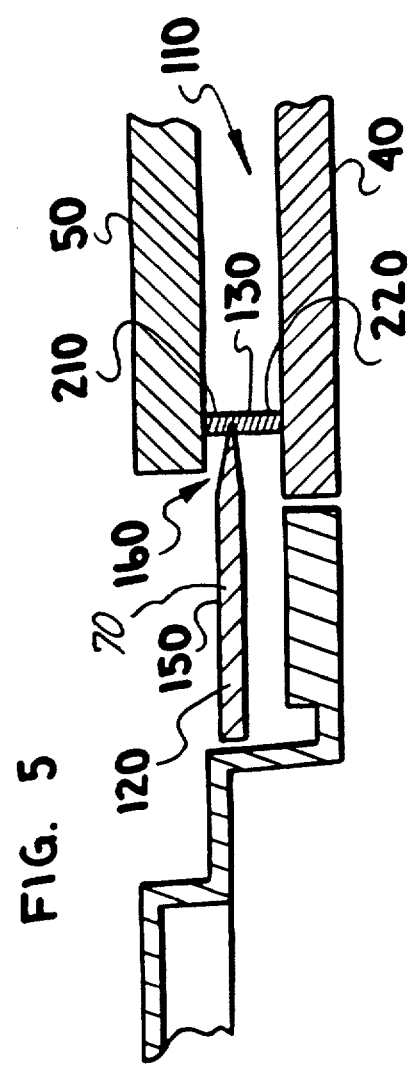

I claim:

1. A window assembly for an optical scanner comprising:
   a first window;
   a second window spaced apart from said first window and substantially parallel thereto forming a substantially transparent gap between said first window and said second window;
   said first window having a first surface and a second surface;
   said second window having a third surface and a fourth surface;
   said second surface and said third surface adjacent said gap;
   a seal rim;
   said seal rim comprising a rim member and a seal member attached to said outer rim member;
   said rim member comprising a tapered region;
   said seal member having at least one downwardly depending flange in unbonded contact with said second surface and at least one upwardly depending flange in unbonded contact with said third surface.

2. The window assembly for an optical scanner according to claim 1 wherein
   said seal member is fabricated of a material having approximately a durometer reading of 15 on the Shore-A scale.

3. The window assembly for an optical scanner according to claim 1 wherein said seal member is fabricated of silicone rubber.

4. A top cover assembly for an optical scanner comprising:
   a scanner top plate;
   a first window;
   a second window spaced apart from said first window and substantially parallel thereto forming a gap between said first window and said second window;
   said first window having a first surface and a second surface;

said second window having a third surface and a fourth surface;

said second surface and said third surface adjacent said gap;

a seal rim;

said seal rim comprising an outer rim member and a seal member;

said seal member having at least one downwardly depending flange in unbonded contact with said second surface and at least one upwardly depending flange in unbonded contact with said third surface;

a window frame assembly insertable into said scanner top plate;

said second window sandwiched between said seal rim and said window frame.

5. The top cover assembly according to claim 4 wherein:

said outer rim member comprises a tapered region.

6. The top cover assembly according to claim 5 wherein:

said outer rim member is fabricated of polycarbonate.

7. The top cover assembly according to claim 5 wherein:

said seal member is fabricated of silicone rubber.

8. An optical scanner comprising:

a first window;

a scanner top plate;

a window frame assembly insertable into said scanner top plate;

a second window spaced apart from said first window and substantially parallel thereto forming a gap between said first window and said second window;

said first window having a first surface and a second surface;

said second window having a third surface and a fourth surface;

said second surface and said third surface adjacent said gap;

a seal rim;

said seal rim comprising an outer rim member and a seal member;

said seal member bonded to said outer rim member;

said seal member comprising at least one downwardly depending flange in unbonded contact with said second surface and at least one upwardly depending flange in unbonded contact with said third surface;

said seal rim and said window frame assembly adapted to fit together into an assembly further comprising said second window and constraining said second window from substantial vertical or horizontal movement with regard to said window frame.

9. The optical scanner according to claim 8 wherein said outer rim member comprises a tapered region.

10. The optical scanner according to claim 9 wherein said outer rim member is fabricated of polycarbonate.

11. The optical scanner according to claim 10 wherein said seal member is fabricated of silicone rubber.

12. An optical scanner comprising a first window;

a scanner top plate;

a window frame assembly;

a second window spaced apart from said first window and substantially parallel thereto forming a substantially transparent gap between said first window and said second window;

said first window having a first surface and a second surface;

said second window having a third surface and a fourth surface;

said second surface and said third surface adjacent said gap;

a seal rim member comprising an outer rim member, a tapered region and a seal member;

said seal member bonded to said tapered region;

said seal member comprising at least one downwardly depending flange of a soft compliant material in unbonded contact with said second surface and at least one upwardly depending flange of a soft compliant material in unbonded contact with said third surface;

said seal rim member and said window frame assembly adapted to form a further assembly comprising said seal rim member, said window frame assembly and said second window wherein said second window is constrained from substantial movement relate to said further assembly;

said further assembly insertable into said scanner top plate.

* * * * *

UNITED STATES PATENT AND TRADEMARK OFFICE
CERTIFICATE OF CORRECTION

PATENT NO. : 5,005,329

DATED : April 9, 1991

INVENTOR(S) : Theodore H. Schorr

It is certified that error appears in the above-identified patent and that said Letters Patent is hereby corrected as shown below:

The title page, showing the illustrative figure should be deleted and therefor substitute the title page, as shown on the attached page.

The drawings sheets, consisting of Figs. 1-5, should be deleted to be replaced with the drawing sheets, consisting of Figs. 1-5, as shown on the atached pages.

Signed and Sealed this

Twenty-third Day of March, 1993

Attest:

STEPHEN G. KUNIN

*Attesting Officer*     Acting Commissioner of Patents and Trademarks

United States Patent [19]

Schorr

[11] Patent Number: 5,005,329
[45] Date of Patent: Apr. 9, 1991

[54] WINDOW SEAL FOR OPTICAL SCANNER

[75] Inventor: Theodore H. Schorr, Eugene, Oreg.

[73] Assignee: Spectra-Physics, Inc., San Jose, Calif.

[21] Appl. No.: 312,696

[22] Filed: Feb. 17, 1989

[51] Int. Cl.⁵ .................................. G06K 7/10
[52] U.S. Cl. .................................. 52/204; 52/398;
52/790; 235/462; 350/589
[58] Field of Search .................. 52/171, 396, 397, 790,
52/208, 204, 398; 277/183; 186/61, 60, 59;
235/462, 467; 350/589

[56] References Cited
U.S. PATENT DOCUMENTS

| 2,285,003 | 6/1942 | Axe | 52/399 |
| 2,303,149 | 11/1942 | Verhagen | 52/399 |
| 2,585,322 | 2/1952 | Bradfield | 52/399 |
| 3,217,454 | 11/1965 | Leisibach | 52/398 |
| 4,691,489 | 9/1987 | Shea | 52/398 |

Primary Examiner—John E. Murtagh
Attorney, Agent, or Firm—Lyon & Lyon

[57] ABSTRACT

A soft compliant seal is attached to either an anchored or a loose reinforcement ring to provide a non-hermetic seal against liquids or particulates in order to maintain a space between two windows substantially free of all foreign matter.

12 Claims, 3 Drawing Sheets